United States Patent
Mohanavelu et al.

(10) Patent No.: US 7,555,670 B2
(45) Date of Patent: Jun. 30, 2009

(54) CLOCKING ARCHITECTURE USING A BIDIRECTIONAL CLOCK PORT

(75) Inventors: Ravindran Mohanavelu, Folsom, CA (US); Aaron K. Martin, El Dorado Hills, CA (US); Dawson Kesling, Davis, CA (US); Joe Salmon, Placerville, CA (US); Mamun Ur Rashid, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 11/260,019

(22) Filed: Oct. 26, 2005

(65) Prior Publication Data

US 2007/0091712 A1    Apr. 26, 2007

(51) Int. Cl.
*G06F 1/04* (2006.01)
*G11C 8/00* (2006.01)

(52) U.S. Cl. .................. 713/600; 713/500; 711/167; 365/233.11; 365/233.12

(58) Field of Classification Search ............... 713/500, 713/600
See application file for complete search history.

(56) References Cited

U.S. PATENT DOCUMENTS

| | | | |
|---|---|---|---|
| 5,305,278 | A | 4/1994 | Inoue |
| 5,546,023 | A | 8/1996 | Borkar et al. |
| 5,604,450 | A | 2/1997 | Borkar et al. |
| 5,661,692 | A | 8/1997 | Pinkham et al. |
| 5,963,464 | A * | 10/1999 | Dell et al. .................. 365/52 |
| 6,226,729 | B1 * | 5/2001 | Stevens et al. .............. 711/171 |
| 6,373,289 | B1 | 4/2002 | Martin et al. |
| 6,437,601 | B1 | 8/2002 | Borkar et al. |
| 6,493,250 | B2 | 12/2002 | Halbert et al. |
| 6,510,503 | B2 * | 1/2003 | Gillingham et al. ......... 711/167 |
| 6,536,025 | B2 | 3/2003 | Kennedy et al. |
| 6,570,944 | B2 | 5/2003 | Best et al. |
| 6,658,509 | B1 | 12/2003 | Bonella et al. |
| 6,697,888 | B1 | 2/2004 | Halbert et al. |
| 6,742,098 | B1 | 5/2004 | Halbert et al. |

(Continued)

FOREIGN PATENT DOCUMENTS

EP    0 862 119 A2    9/1998

(Continued)

OTHER PUBLICATIONS

PCT, International Search Report and Written Opinion of the International Searching Authority, Application No. PCT/US2006/041991, mailed Aug. 14, 2007.

(Continued)

*Primary Examiner*—Chun Cao
(74) *Attorney, Agent, or Firm*—Blakely, Sokoloff, Taylor & Zafman LLP

(57) ABSTRACT

Embodiments of the invention are generally directed to systems, methods, and apparatuses for a clocking architecture using a bidirectional clock. In an embodiment, a chip includes a bidirectional clock port capable of being statically configured to receive or to transmit a reference clock. In one embodiment, the chip includes a first port to receive data and a second port, wherein the chip repeats at least a portion of the data that it receives on the first port to a transmitter at the second port. Other embodiments are described and claimed.

18 Claims, 6 Drawing Sheets

U.S. PATENT DOCUMENTS

| | | | |
|---|---|---|---|
| 6,747,474 B2 | 6/2004 | Borkar et al. | |
| 6,832,325 B2 | 12/2004 | Liu | |
| 6,847,617 B2 | 1/2005 | Borkar et al. | |
| 6,871,253 B2 | 3/2005 | Greeff et al. | |
| 6,898,726 B1 * | 5/2005 | Lee | 713/503 |
| 7,043,652 B2 * | 5/2006 | Matsui | 713/400 |
| 7,043,657 B1 * | 5/2006 | Yang et al. | 713/503 |
| 7,155,627 B2 * | 12/2006 | Matsui | 713/401 |
| 7,180,821 B2 * | 2/2007 | Ruckerbauer et al. | 365/221 |
| 2002/0101294 A1 | 8/2002 | Wright | |
| 2002/0112119 A1 | 8/2002 | Halbert et al. | |
| 2002/0144173 A1 * | 10/2002 | Jeddeloh | 713/501 |
| 2003/0231043 A1 | 12/2003 | Ibuka | |
| 2005/0146980 A1 | 7/2005 | Mooney et al. | |

FOREIGN PATENT DOCUMENTS

| | | |
|---|---|---|
| JP | 07 107105 A | 4/1995 |
| JP | 11 204649 A | 7/1999 |
| WO | WO 99/31803 A | 6/1999 |
| WO | WO 9931803 | 6/1999 |

OTHER PUBLICATIONS

"Memory Technology Evolution: an Overview of System Memory Technologies," Technology Brief, 5th edition, Hewlett-Packard Development Company, 17 pages.

International Preliminary Report on Patentability; PCT/US2006/041991; Report issued Apr. 29, 2008; 9 pages.

German Office Action, Patent Application No.: DE 11 2006 002 559T5, ; Issued Oct. 30, 2008; 4 pages.

* cited by examiner

CLOCKING ARCHITECTURE USING A BIDIRECTIONAL CLOCK PORT

TECHNICAL FIELD

Embodiments of the invention generally relate to the field of integrated circuits and, more particularly, to systems, methods and apparatuses for a clocking architecture using a bidirectional reference clock port.

BACKGROUND

A conventional source synchronous clocking architecture can be used in, for example, memory systems to provide a reference clock to one or more dynamic random access memory (DRAM) devices. In conventional source synchronous systems, a memory controller generates the reference clock using, for example, a phase locked loop. The memory controller then provides the reference clock to a primary DRAM which, in turn, distributes the reference clock to the receiver clock trees of one or more secondary DRAMs.

The primary DRAM receives the reference clock and propagates it through a receiver clocking tree and a transmitter clocking tree. The reference clock then passes through the receiver clock tree of a secondary DRAM. Each secondary DRAM uses the reference clock to control the transmission of data back to the primary DRAM. In general, the reference clock used to control the transmission of data back to the primary DRAM has traversed the memory controller clock tree, the channel, the primary DRAM receiver clock tree and the primary DRAM transmitter clock tree.

The clock cycle receiving the data at the primary DRAM will be a few cycles different from the one transmitting it at the secondary DRAM. In the presence of supply noise in the range of (for example) 100 Mhz or greater, this clock to data delay mismatch results in significant jitter. The jitter can make the reference clock unusable above certain frequencies for many applications.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for a clock architecture using a bidirectional clock port. In an embodiment, at least some of the chips within a system include a bidirectional clock port. The bidirectional clock port can be configured to either transmit a reference clock or to receive a reference clock. In an embodiment, a primary chip (e.g., a primary DRAM) splits the reference clock and transmits it through its bidirectional clock port. Each secondary chip receives the reference clock at its bidirectional clock port and uses it to transmit data without the need for the reference clock to traverse the transmit clock tree of the primary DRAM. As is further discussed below, embodiments of the invention provide greater immunity to supply noise induced jitter.

Figure 1:
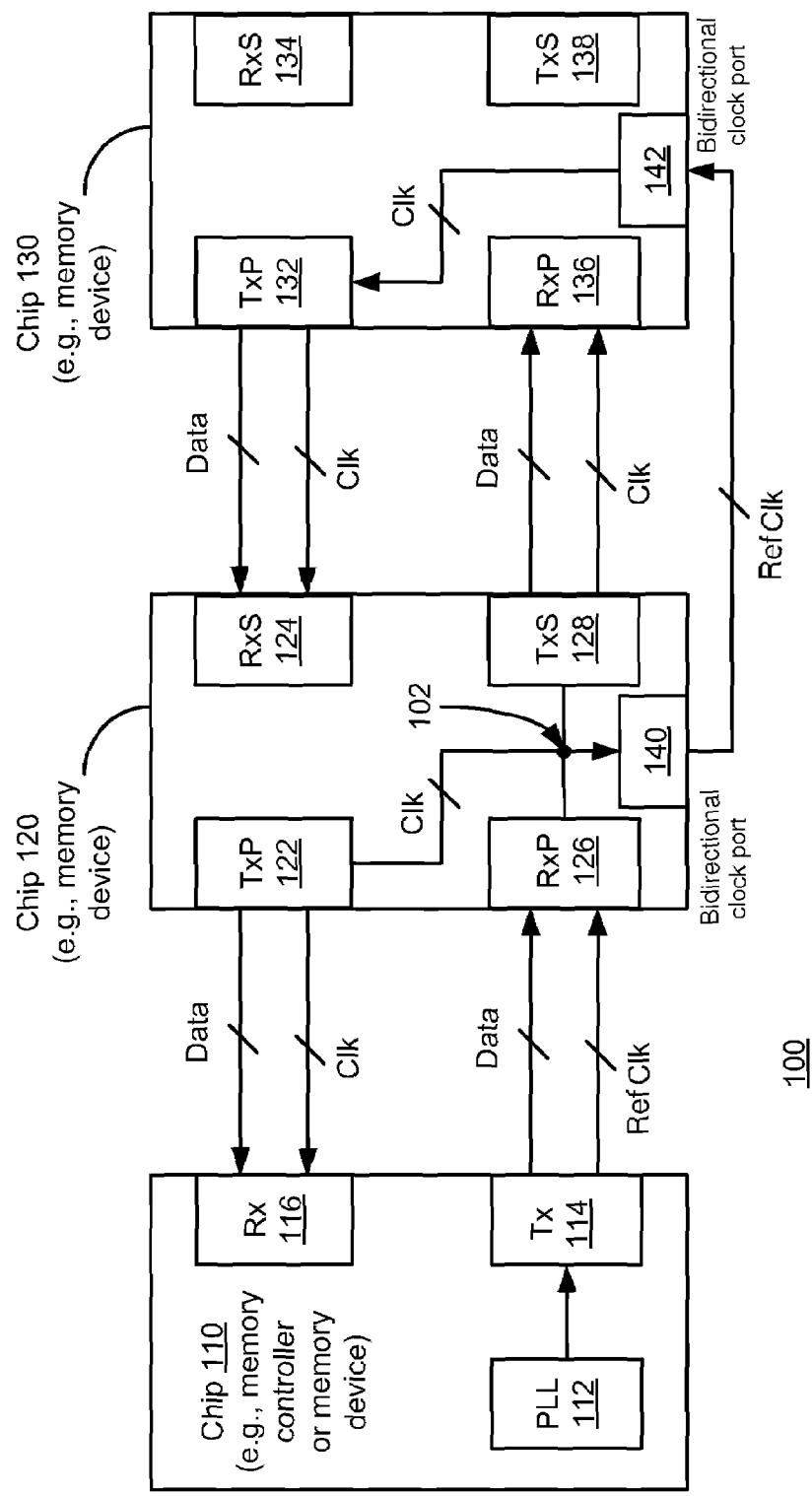
FIG. 1 is a high-level block diagram illustrating selected aspects of a system of chips implemented according to an embodiment of the invention.

FIG. 1 is a high-level block diagram illustrating selected aspects of a system of chips implemented according to an embodiment of the invention. System 100 includes chips 110, 120, and 130 arranged in a repeating architecture. The term "repeating architecture" refers to an architecture in which chips receive data in one port and repeat (at least a portion of) that data out of a second port. For example, chip 120 receives data on ports 126 and 124 and repeats the data by transmitting it respectively from ports 128 and 122.

Chips 120 and 130 use a reference clock from chip 110 to transmit data from ports 122 and 132 respectively. In an embodiment, the reference clock is generated, at least in part, by phase-locked loop (PLL) 112 and passed to chip 120. Chip 120 splits the reference clock (e.g., at 102) and retransmits it from bidirectional clock port 140. In an embodiment, bidirectional clock port 140 is a clock port that can be configured to be either a transmitter or a receiver. In one embodiment, the reference clock is split off before it goes through the secondary transmitter 128 of chip 120.

Chip 130 receives the reference clock on bidirectional clock port 142. The received reference clock is passed from bidirectional clock port 142 to primary transmitter 132. Chip 130 uses the reference clock to control the transmission of data from primary transmitter 132. In an embodiment, the use of bidirectional clock ports 140 and 142 reduces jitter because the length of the reference clock path is reduced in comparison to the length of the reference clock path in, for example, a conventional source synchronous system. In the illustrated embodiment, the length of the reference clock path is reduced, for example, because it does not pass through secondary transmitter 128 (and its associated clock tree) and primary receiver 136 (and its associated clock tree).

Figure 2:
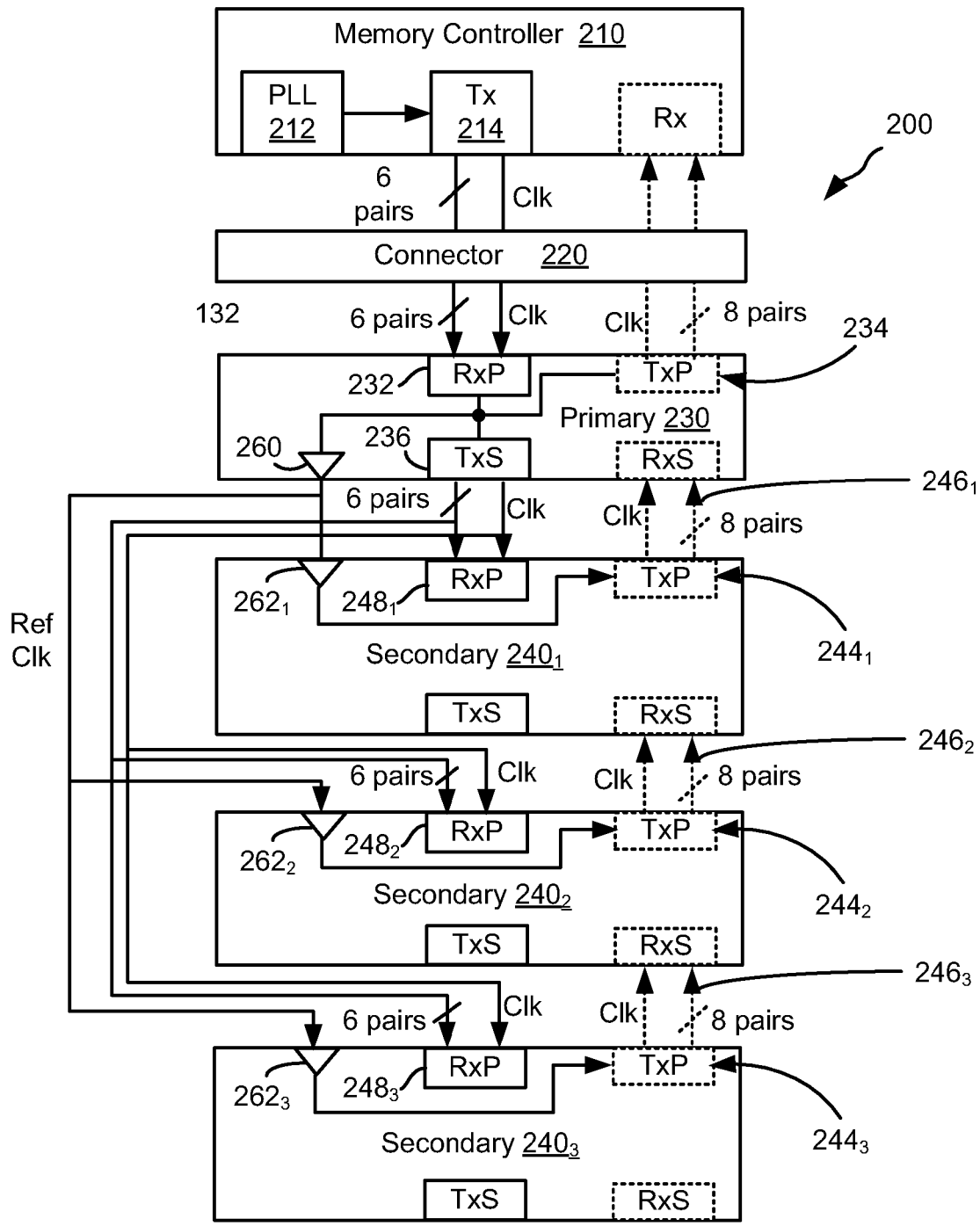
FIG. 2 is a block diagram illustrating selected aspects of a memory system implemented according to an embodiment of the invention.

FIG. 2 is a block diagram illustrating selected aspects of a memory system implemented according to an embodiment of the invention. Memory system 200 includes memory controller 210, connector 220, and memory devices 230/240. In an embodiment, memory system 200 includes a repeating architecture. That is, each memory device repeats (at least a portion of) the data that it receives in both the primary direction (e.g., the direction facing memory controller 210) and the secondary direction (e.g., the direction facing away from (or opposing) memory controller 210).

Memory controller 210 controls, at least in part, the flow of data between memory devices 230/240 and, for example, one or more processors. In an embodiment, memory controller 210 provides a reference clock (e.g., a source synchronous clock) using, for example, phase-locked loop 212. Transmitter 214 sends the reference clock to memory device 230 through, for example, connector 220. Connector 220 is, for example, the physical connector into which a memory module (e.g., a dual inline memory module (DIMM)) is inserted.

Primary memory device 230 receives the reference clock on primary receiver 232. In an embodiment, the reference clock is branched out from the reference clock tree and provided to bidirectional clock port 260 for distribution to secondary memory devices 240. In one embodiment, bidirectional clock port 260 is configured to transmit the reference clock to secondary memory devices 240. In such an embodiment, bidirectional clock ports 262 are configured to receive the reference clock.

At each secondary memory device 240, the reference clock is received at a bidirectional clock port 262. The reference clock is then sent to transmitter 244. In an embodiment, transmitter 244 uses the reference clock to control (at least in part) the transmission of data on, for example, links 246. In one embodiment, links 246 are point-to-point links in a memory channel. In an alternative embodiment, links 246 may be implemented differently (e.g., as links in a data network).

In the illustrated embodiment, the reference clock bypasses secondary transmitter 236 (primary memory device 230) and primary receivers 248 (secondary memory devices 240). The reference clock exhibits less jitter because the clock path is shorter and it goes through fewer clock trees. In an embodiment, higher data rates are possible on the chip to chip links (e.g., links 246) because the reference clock exhibits less jitter (e.g., less jitter than the links in a conventional source synchronous system would exhibit).

Memory devices 230/240 may be any type of memory device that is suitable for providing system memory. For example, in an embodiment, memory devices 230/240 are dynamic random access memory devices (DRAMs). In an alternative embodiment, memory devices 230/240 may be synchronous DRAM (SDRAM), static random access memory (SRAM), magnetic random access memory (MRAM), and the like.

In an embodiment, device 230 is a primary DRAM and devices 240 are secondary DRAMs. As described above, in one embodiment, a source synchronous clock is branched out after the receive clock tree of primary DRAM 230. This clock is then distributed from a bidirectional clock port on primary DRAM 230 to a bidirectional clock port on each of the secondary DRAMs 240. Secondary DRAMs 240 use the clock in their transmitters 244. In an embodiment, links 246 exhibit less jitter than conventional links because the clock path shown in FIG. 2 is shorter than the clock path used in conventional links. Table 1 illustrates jitter as a function of noise according to an embodiment of the invention. As shown in table 1, in an embodiment, jitter can be decreased by nearly 50% when supply noise is approximately 2.5%. In an embodiment, a similar trend is exhibited when different PLL jitter contributions are added to the link.

TABLE 1

| Supply noise amplitude in % | Jitter in conventional source-synchronous design from supply noise (ps) | Jitter in an embodiment of the invention with reference clock from supply noise (ps) |
| --- | --- | --- |
| 0 | 0 | 0 |
| 2.5 | 77 | 43 |
| 5 | 157 | 96 |
| 7.5 | 248 | 158 |
| 10 | 339 | 221 |

Figure 3:
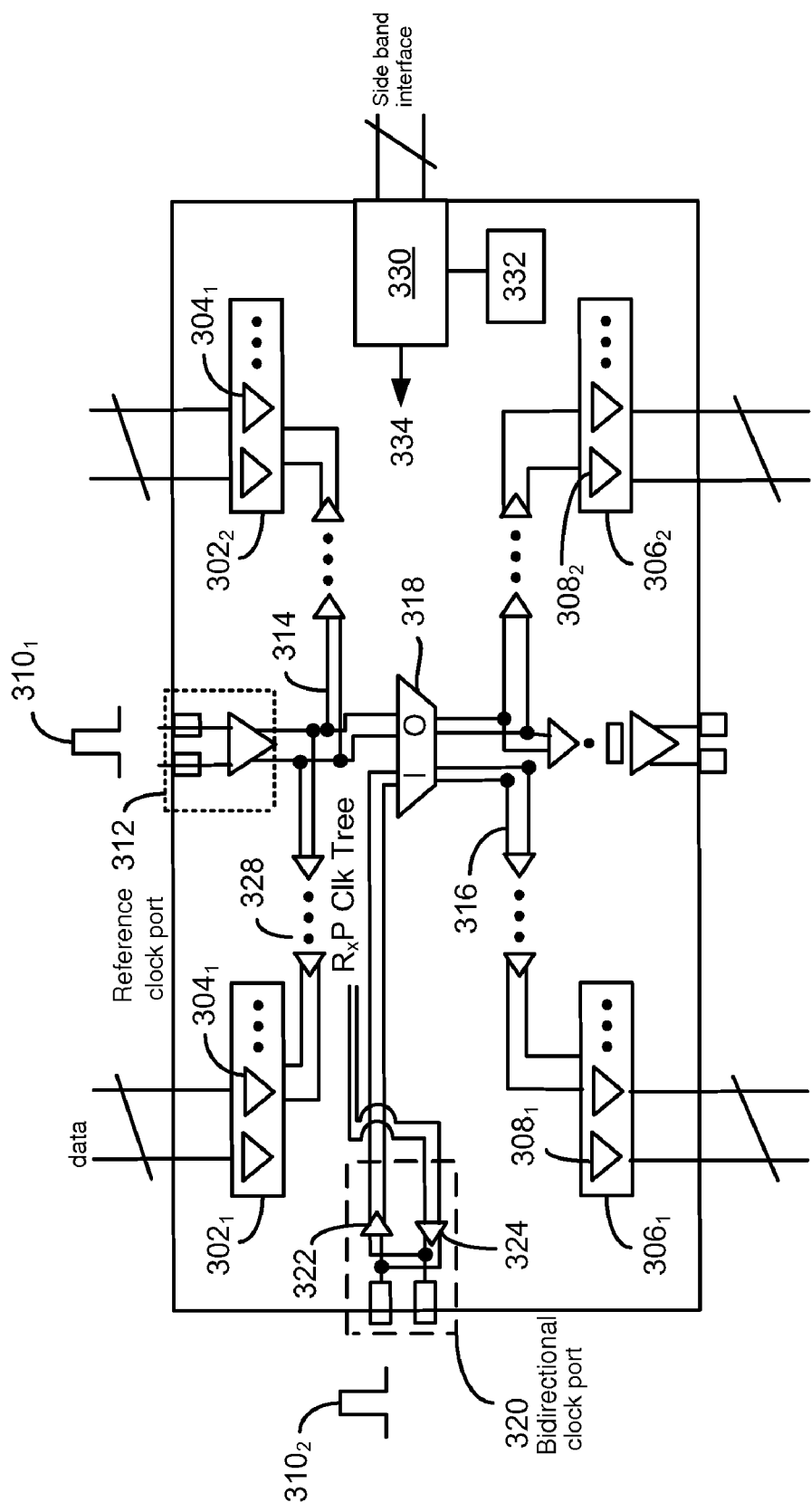
FIG. 3 is a block diagram illustrating selected aspects of a chip having a bidirectional clock port, according to an embodiment of the invention.

FIG. 3 is a block diagram illustrating selected aspects of a chip having a bidirectional clock port, according to an embodiment of the invention. Chip 300 may be any chip suitable for use in a system in which data is repeated from one chip to another chip in a cascaded fashion. For example, in one embodiment, chip 300 is a memory device such as a dynamic random access memory device (DRAM). In an alternative embodiment, chip 300 may be a network interface (I/F) chip such as a token ring I/F.

In an embodiment, chip 300 supports a repeating function. That is, chip 300 receives data from a source (e.g., a memory controller) and repeats at least a portion of that data to another chip (or chips). In the illustrated embodiment, for example, chip 300 receives data on receive ports 302. Receive ports 302 include receivers 304. It is to be appreciated that chip 300 is illustrated as having two receive ports 302 merely for the purposes of explanation. In an embodiment, chip 300 may have more than two receive ports 302 or a single receive port 302.

Chip 300 also includes transmit data ports 306 having transmitters 308. In an embodiment, at least a portion of the data received on ports 302 is repeated through ports 306 to another chip (or chips). It is to be appreciated that chip 300 is illustrated as having two transmit ports 306 merely for the purposes of explanation. In an embodiment, chip 300 may have more than two transmit ports 306 or a single transmit port 306.

In an embodiment, chip 300 can be configured to be either a primary chip or a secondary chip. A "primary chip" refers to a chip that is configured to transmit the reference clock to another chip and a "secondary chip" refers to a chip that is configured to receive the reference clock from the primary chip. The configuration of chip 300 may include configuring bidirectional clock port 320 and selecting an input for multiplexer 318.

In an embodiment, bidirectional clock port 320 can be configured to either receive a reference clock or to transmit a reference clock. For example, bidirectional clock port 320 may be configured to receive a reference clock by enabling receiver 322 and disabling transmitter 324. Similarly, bidirectional clock port 320 may be configured to transmit a reference clock by enabling transmitter 324 and disabling receiver 322. In an alternative embodiment, the configuration of bidirectional clock port 320 may include more, fewer, and/or different elements.

In an embodiment, transmit clock tree 316 receives reference clock 310 from one of two sources depending on whether chip 300 is configured as a primary or a secondary chip. If chip 300 is configured to be a primary chip, then transmit clock tree 316 receives reference clock 310 from reference clock port 312. Alternatively, if chip 300 is configured to be a secondary chip, then transmit clock tree 316 receives reference clock 310 from bidirectional clock port 320. In one embodiment, multiplexer 318 selects which source provides reference clock 310.

Reference clock 310 may be, for example, a source-synchronous clock used to synchronize the transmission of data among a plurality of chips. In one embodiment, reference clock 310 is a differential signal. In an alternative embodiment, reference clock 310 is a single-ended signal. A "differential signal" refers to transmitting information over a pair of transmission lines and a "single-ended signal" refers to transmitting information over a single transmission line. In an embodiment, reference clock 310 is distributed to receivers 304 over receive clock tree 314 (via, for example, buffers 328).

In an embodiment, chip 300 is configured during system startup. For example, chip 300 may be configured by the basic I/O system (BIOS) of an associated computer system. In such an embodiment, the BIOS may read configuration bits 332 during system startup to determine whether chip 300 is a primary chip or a secondary chip. The BIOS may then provide configuration information 334 to configure chip 300. Configuration information 334 may be used, for example, to select an input for a switching element (e.g., multiplexer 318) and/or to enable/disable receiver 322 and transmitter 324. In an alternative embodiment, the determination of whether chip 300 is a primary or a secondary chip may occur dynamically (e.g., adaptively).

In an embodiment, sideband I/O interface 330 provides an interface to configure chip 300. Sideband I/O interface 330 may be, for example, an auxiliary interface of chip 300. In an alternative embodiment, a different interface may be used to configure chip 300. For example, in one alternative embodiment, a conventional interface (e.g., receive ports 302 and/or transmit ports 306) may used to configure chip 300 during an initialization period. In another alternative embodiment, chip 300 may use an adaptive configuration scheme to determine whether it is a primary or a secondary chip. The adaptive configuration scheme may include the use of a separate pin that can be tied either high or low to designate whether chip 300 is a primary or a secondary chip.

Figure 4:
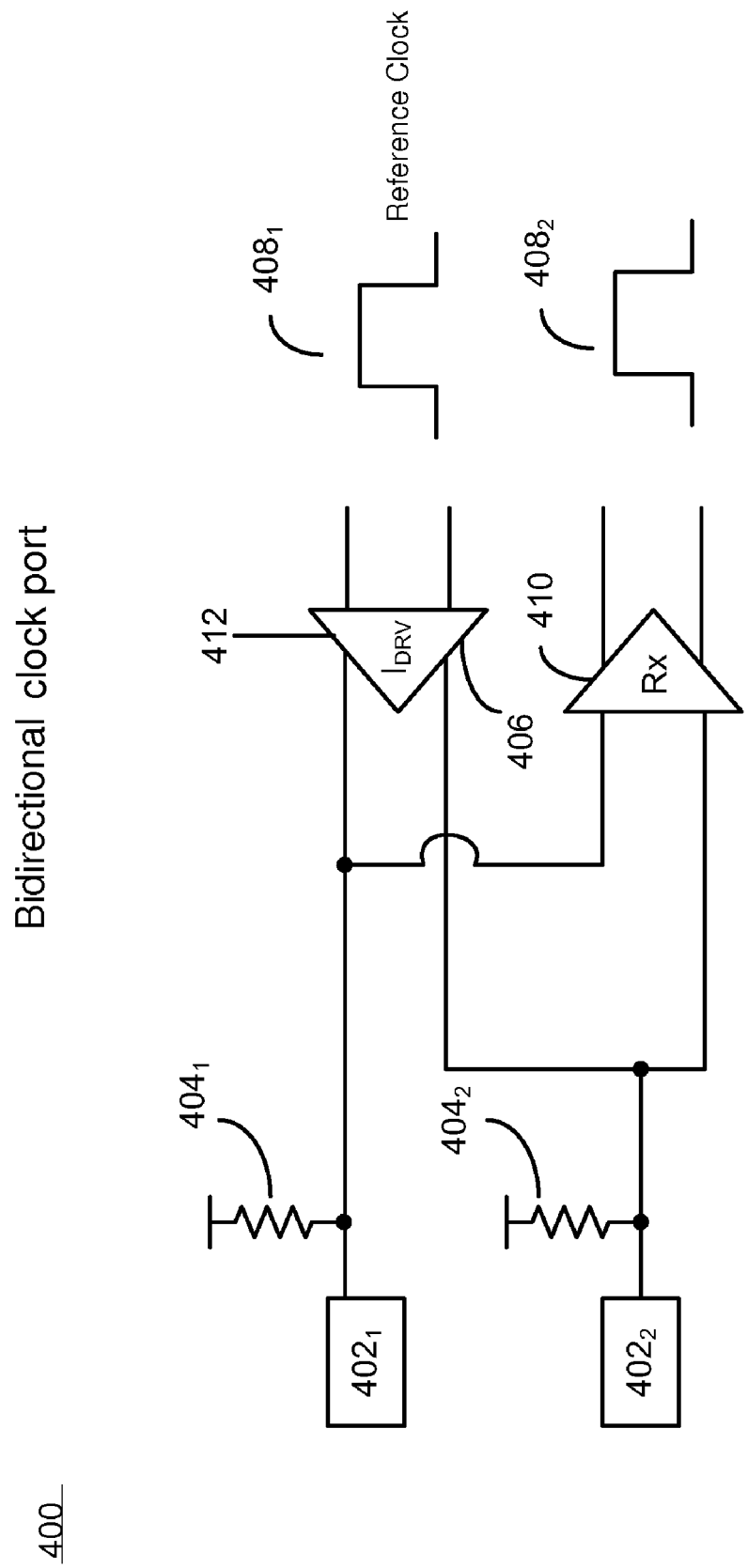
FIG. 4 is a circuit diagram illustrating selected aspects of a bidirectional clock port implemented according to an embodiment of the invention.

FIG. 4 is a circuit diagram illustrating selected aspects of a bidirectional clock port implemented according to an embodiment of the invention. Pins 402 provide an electrical connectional between bidirectional clock port 400 and, for example, a differential clock channel. In an alternative embodiment, (e.g., a single-ended embodiment), bidirectional clock port 400 may include only one pin 402. In one embodiment, termination resistors 404 are tied to pins 402.

In an embodiment, bidirectional clock port 400 can be configured to either transmit or to receive reference clock 408. When configured as a transmitter, current mode driver 406 sinks a current from pins 402. Alternatively, if bidirectional clock port 400 is configured as a receiver, then it receives reference clock 408 using, for example, receiver 410. In an embodiment, the configuration of bidirectional clock port 400 is accomplished by disabling (or, conversely, enabling) current driver 406 and/or receiver 410. For example, in the illustrated embodiment, disable input 412 can be used to disable/enable current driver 406 and thereby configure port 400 to transmit or to receive reference clock 408.

Figure 5:
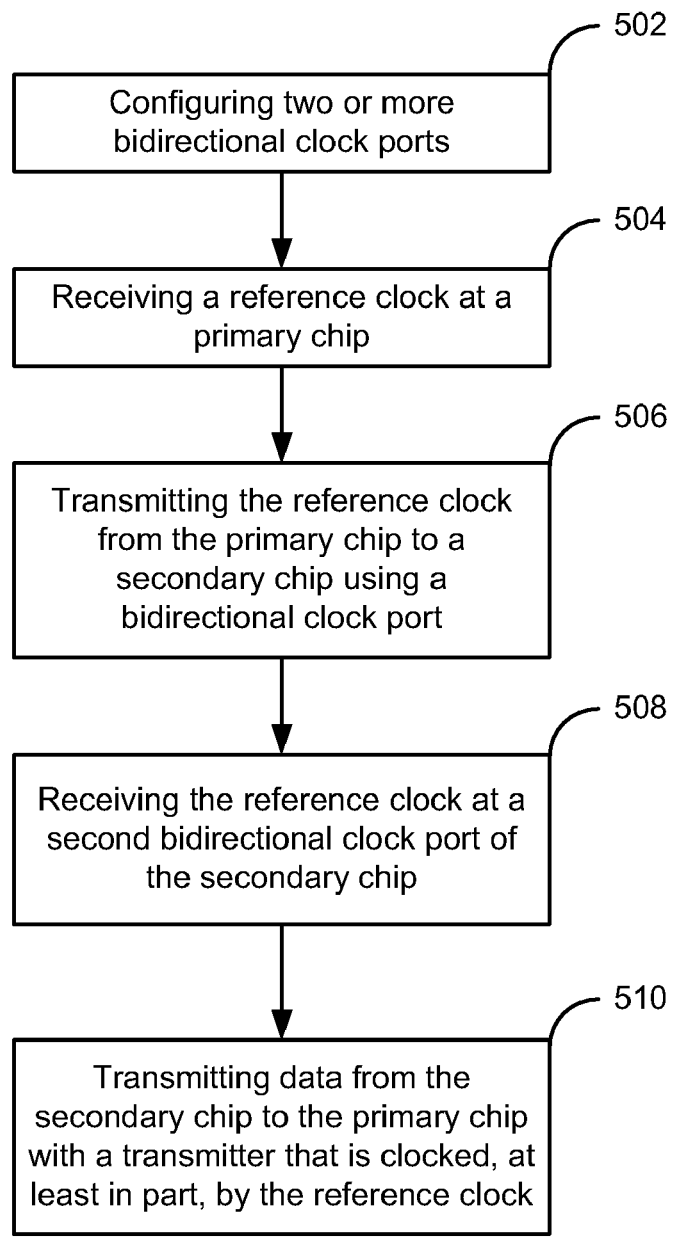
FIG. 5 is a flow diagram illustrating selected aspects of a method for a clocking architecture using a bidirectional reference clock, according to an embodiment of an invention.

FIG. 5 is a flow diagram illustrating selected aspects of a method for a clocking architecture using a bidirectional reference clock, according to an embodiment of an invention. A system (e.g., memory system 200, shown in FIG. 2) may include two or more chips each having a bidirectional clock port. In an embodiment, each bidirectional clock port can be configured to either transmit or to receive a clock. Referring to process block 502, two or more bidirectional clock ports are configured to distribute a clock. For example, one bidirectional clock port (on a primary chip) is configured to transmit a clock and another bidirectional clock port (on a secondary chip) is configured to receive the clock. In one embodiment, the primary chip and the secondary chip are configured at system startup. In an alternative embodiment, the configuration may be associated with a different event.

The clock is received at a primary chip at 504. In one embodiment, the received clock is a reference clock that is provided by, for example, a memory controller. In such an embodiment, the primary chip may be a primary DRAM.

Referring to process block 506, the clock is transmitted from the primary chip to a secondary chip using a bidirectional clock port. In an embodiment, the bidirectional clock port is statically configured to transmit the clock. The term "statically configured" refers to retaining the configuration of the port in accordance with a configuration policy. For example, a bidirectional clock port may be configured in response to an event (e.g., system startup) and retained until a reoccurrence of the event (or the occurrence of another event). Alternatively, a bidirectional clock port may hold its configuration for a fixed length of time.

In an embodiment, the primary chip and the secondary chip are substantially identical. The term "substantially identical" refers to chips that perform (at least in substantial part) the same function. Examples of chips that are substantially identical include memory devices such as dynamic random access memory devices (DRAMs). Other examples of chips that are substantially identical include chips that enable networking, such as token ring and the like. In some embodiments, the primary chip and/or the secondary chip are capable of providing a repeating function. In such embodiments, the primary chip and/or the secondary chip may receive data on a first port and repeat (at least a portion of that) data on a transmitter of a second port.

Referring to process block 508, a secondary chip receives the clock at its bidirectional clock port. In an embodiment, the bidirectional clock port on the secondary chip can be statically configured to either transmit or to receive the clock. In one embodiment, both the primary chip and the secondary chip are configured at system startup. In an embodiment, the secondary chip uses the clock to drive one or more transmitters. In such an embodiment, the received clock is provided to the one or more transmitters of the secondary chip. Referring to process block 510, data is transmitted from the secondary chip to another chip (e.g., the primary chip) using a transmitter that is clocked, at least in part, by the clock received from the primary chip.

Figures 6A, 6B:
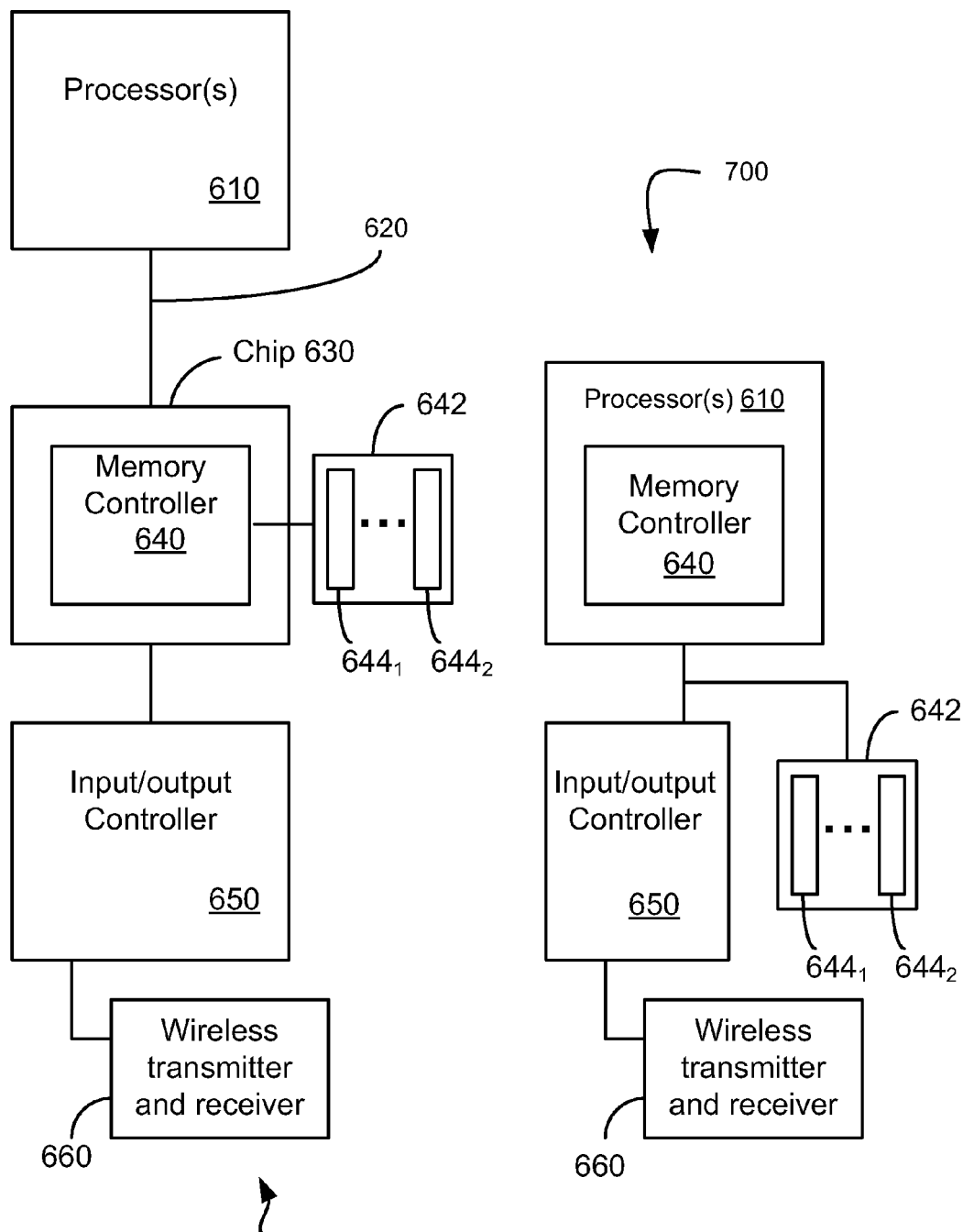
FIGS. 6A and 6B are block diagrams illustrating selected aspects of computing systems.

FIGS. 6A and 6B are block diagrams illustrating, respectively, selected aspects of computing systems 600 and 700. Computing system 600 includes processor 610 coupled with an interconnect 620. In some embodiments, the term processor and central processing unit (CPU) may be used interchangeably. In one embodiment, processor 610 is a processor in the XEON® family of processors available from Intel Corporation of Santa Clara, Calif. In an alternative embodiment, other processors may be used. In yet another alternative embodiment, processor 610 may include multiple processor cores.

In one embodiment, chip 630 is a component of a chipset. Interconnect 620 may be a point-to-point interconnect or it may be connected to two or more chips (e.g., of the chipset). Chip 630 includes memory controller 640 which may be coupled with main system memory (e.g., as shown in FIG. 1). In an alternative embodiment, memory controller 640 may be on the same chip as processor 610 as shown in FIG. 6B. Memory system 642 includes memory devices (e.g., DRAMs) 644. Each memory device 644 includes a bidirectional clock port. In an embodiment, the bidirectional clock ports provide, in part, a clock path that is shorter than in conventional systems. In one embodiment, the shorter clock path reduces jitter on the links between the memory devices.

Input/output (I/O) controller 650 controls the flow of data between processor 610 and one or more I/O interfaces (e.g., wired and wireless network interfaces) and/or I/O devices. For example, in the illustrated embodiment, I/O controller 650 controls the flow of data between processor 610 and wireless transmitter and receiver 660. In an alternative embodiment, memory controller 640 and I/O controller 650 may be integrated into a single controller.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A chip comprising:
    a bidirectional clock port, the bidirectional clock port statically configured to either receive or transmit a clock signal for two or more chips;
    a first port to receive data;
    a second port to repeat at least a portion of the received data from the first port via a data transmitter at the second port;
    an input/output (I/O) port to provide an interface for configuration information; and
    a switching element coupled with the I/O port, the switching element to select a clock signal for a transmit clock tree responsive, at least in part, to the configuration information.

2. The chip of claim 1, wherein the I/O port includes a sideband I/O port.

3. The chip of claim 1, further comprising:
    a configuration input to selectively disable the transmitter coupled with the bidirectional clock port.

4. The chip of claim 1, further comprising:
    a third port having a data transmitter clocked, at least in part, by the clock signal.

5. The chip of claim 1, further comprising a memory array.

6. The chip of claim 1, wherein the bidirectional clock port is a differential bidirectional clock port.

7. The chip of claim 1, wherein the two or more chips include two or more memory devices.

8. The chip of claim 7, wherein the two or more memory devices include two or more dynamic random access memory (DRAM) devices.

9. The chip of claim 1, wherein the clock signal is a reference clock signal.

10. The chip of claim 9, wherein the reference clock signal is a source synchronous clock signal.

11. The chip of claim 1, wherein the chip includes a memory device.

12. A system comprising:
    a first memory device including a first bidirectional clock port, wherein the first bidirectional clock port is statically configured to transmit a reference clock signal to another memory device; and
    a second memory device coupled with the first memory device, the second memory device including a second bidirectional clock port, wherein the second bidirectional clock port is statically configured to receive the reference clock signal from the first memory device;
    wherein the first memory device having:
        a first port to receive data;
        a second port to repeat at least a portion of the received data from the first port via a data transmitter at the second port;
        an input/output (I/O) port to provide an interface for configuration information; and
        a switching element coupled with the I/O port, the switching element to select a clock signal for a transmit clock tree responsive, at least in part, to the configuration information.

13. The system of claim 12, wherein the first memory device further comprises:
    a third port having a transmitter clocked, at least in part, by the reference clock signal.

14. The system of claim 12, wherein the first memory device and the second memory device are dynamic random access memory (DRAM) devices.

15. The system of claim 14, further comprising:
    a memory module, wherein the first DRAM and the second DRAM are mounted on the memory module.

16. A method comprising:
    receiving a reference clock signal at a primary chip;
    transmitting the reference clock from the primary chip to a secondary chip via a first bidirectional clock port, wherein the first bidirectional clock port is statically configured to transmit the reference clock signal; and
    receiving the reference clock at a second bidirectional clock port of the secondary chip, wherein the second bidirectional clock port is statically configured to receive the reference clock signal from the primary chip;
    wherein the primary chip having:
        a first port to receive data;
        a second port to repeat at least a portion of the received data from the first port via a data transmitter at the second port;
        an input/output (I/O) port to provide an interface for configuration Information; and
        a switching element coupled with the I/O port, the switching element to select a clock signal for a transmit clock tree responsive, at least in part, to the configuration information.

17. The method of claim 16, further comprising:
    transmitting data from the secondary chip to the primary chip from a transmitter on the secondary chip, wherein the transmitter is clocked, at least in part, by the reference clock signal.

18. The method of claim 16, wherein the primary chip and the secondary chip respectively comprise a primary memory device and a secondary memory device.

* * * * *